United States Patent [19]
Jachow et al.

[11] Patent Number: 5,569,409
[45] Date of Patent: Oct. 29, 1996

[54] FINELY DIVIDED ACICULAR MAGNETIC MODIFIED CHROMIUM DIOXIDE

[75] Inventors: Harald Jachow, Worms; Reinhard Körner, Frankenthal; Ronald J. Veitch, Maxdorf; Ekkehard Schwab, Neustadt; Helmut Jakusch, Frankenthal; Bernd Höppner, Neustadt; Rudi Lehnert, Ludwigshafen; Manfred Ohlinger, Frankenthal, all of Germany

[73] Assignee: BASF Magnetics GmbH, Mannheim, Germany

[21] Appl. No.: 341,962

[22] Filed: Nov. 16, 1994

[30] Foreign Application Priority Data

Nov. 23, 1993 [DE] Germany .......................... 43 39 841.3

[51] Int. Cl.⁶ ............................................... C01G 37/027
[52] U.S. Cl. ................ 252/62.56; 252/62.51 C; 252/62.55; 428/328; 428/332; 428/694 BA; 428/900
[58] Field of Search ...................... 428/328, 332, 428/694 BA, 900; 252/62.51, 62.55, 62.56

[56] References Cited

U.S. PATENT DOCUMENTS

| | | | |
|---|---|---|---|
| 3,911,095 | 10/1975 | Montiglio et al. | 423/607 |
| 4,311,770 | 1/1982 | Demazeau et al. | 428/694 |
| 4,524,008 | 6/1985 | Chen et al. | 252/62.56 |
| 4,670,177 | 6/1987 | Ohlinger et al. | 252/62.55 |
| 4,698,220 | 10/1987 | Crandall et al. | 423/607 |
| 4,769,165 | 9/1988 | Chen et al. | 252/62.51 |
| 4,803,291 | 2/1989 | Rousset et al. | 556/31 |
| 5,030,371 | 7/1991 | Mueller et al. | 252/62.55 |
| 5,378,383 | 1/1995 | Jachow et al. | 252/62.56 |

FOREIGN PATENT DOCUMENTS

| | | |
|---|---|---|
| 304851 | 3/1989 | European Pat. Off. . |
| 3209739 | 10/1982 | Germany . |
| 1524576 | 9/1978 | United Kingdom . |

*Primary Examiner*—Stevan A. Resan
*Attorney, Agent, or Firm*—Keil & Weinkauf

[57] ABSTRACT

A finely divided acicular $CrO_2$ modified with iron, tellurium and/or antimony and having a high coercive force possesses improved heat stability of the residual induction and a relatively narrow distribution of the particle size and of the coercive force. This $CrO_2$ pigment is obtained by a method in which the iron compound used for the modification is iron oxalate, which is employed in an amount of 1–10% by weight, based on the theoretical $CrO_2$ yield.

4 Claims, 2 Drawing Sheets

( according to the invention )

Fig. 1  (according to the invention)

FINELY DIVIDED ACICULAR MAGNETIC MODIFIED CHROMIUM DIOXIDE

FIELD OF THE INVENTION

The present invention relates to finely divided acicular magnetic chromiumdioxide modified with iron and tellurium and/or antimony and having a coercive force of at least 40 kA/m, a saturation magnetization of at least 85 nTma$^3$/g and a specific surface area (SSA) of at least 25 m$^2$/g, and a process for the preparation of such a material having a narrow coercive force distribution and improved heat stability of the magnetic properties, and the use thereof in a magnetic recording medium.

BACKGROUND OF THE INVENTION

Acicular chromium dioxide, its preparation and the use of this material for magnetic recording media have been described in many publications. Compared with recording media based on other magnetic oxides, magnetic recording media which contain chromium dioxide generally have superior magnetic properties which are due to the high values of the coercive force and of the specific remanence and saturation magnetization and in particular to the uniform shape and the small dimensions of the acicular chromium dioxide particles.

The development in the processing of analog and in particular digital audio and video signals, which has now made further progress, and increasing requirements with regard to the thermal stability of the magnetic recording also necessitate correspondingly improved magnetic recording media for the storage thereof. In the case of magnetic recording media which contain magnetizable particles, for example chromium dioxide, in the binder matrix of the magnetic layer, this means that, on the one hand, an increase in the coercive force of the magnetic particles and a reduction in their particle size are necessary in order to increase the storage density. In addition, it should be ensured that the magnetic moment of the particles remains constant or is increased if possible so that the residual flux of the magnetic layer, which is decisive for the recording level, is maintained. On the other hand, independently of the level of the coercive force, it should be ensured that the particle size distribution of the pigment sample remains very narrow since the thermal stability of the residual flux is also determined by this. Moreover, it should be guaranteed that the coercive force distribution, which is determined not only by the particle size but decisively by the distribution of the dopants used, remains narrow. In the case of a broad distribution, the low-coercivity fraction, which in some cases is identical to the smaller particles of the size distribution, tends to undergo thermal demagnetization more readily than the high-coercivity fraction. Finally, the degree of thermal demagnetization is influenced by the level of the Curie temperature of the pigment.

There has therefore been no lack of attempts to push ahead the development of chromium dioxide in the direction of higher coercive force but, independently of the coercive force, also toward higher saturation magnetization and at the same time a narrower switching field distribution and particle size distribution.

Processes for the preparation of CrO$_2$ pigments having coercive forces of more than 61 kA/m are described in DE 26 48 305, DE 38 37 646 and EP-A 0 548 642, the chromium dioxide prepared according to EP-A 0 548 642 most closely approaching the desired property profile and representing the preamble of the present invention.

The stated EP-A 0 548 642 describes a process for the preparation of CrO$_2$ modified with iron and tellurium and/or antimony and having a coercive force of more than 60 kA/m, a saturation magnetization of at least 85 nTm$^3$/g and a very narrow particle size distribution whose mean deviation from the average needle length is less than 35%. Although these chromium dioxide materials prepared according to EP-A 0 548 642 are suitable for the future high-density recording media and storage methods, there is still a need for products further improved with regard to the coercive force distribution and hence the heat stability, as revealed by corresponding temperature-dependent measurements of the residual induction and of the susceptibility.

It has been found that the half-width $\Delta T$ of the signal peak observed in a measurement of the susceptibility is a measure of the temperature range in which the gradual thermal demagnetization of the sample takes place. The determination of the half-width is shown in FIGS. 1 and 2. A narrow peak therefore represents a uniform sample which contains only small amounts of particle fractions switching at low temperatures, whereas a broad peak shows that a broad particle size distribution is present, with a correspondingly broadly distributed range of thermally switching particles. A measure of the distribution width of particle fractions switching at high temperatures is the slope of the tangent T to the curve 2 (cf. FIGS. 1 and 2). A gentle slope represents a broad distribution.

In the temperature-dependent measurement of the residual induction $M_r$, the more non-uniform the sample, the more sharply the $M_r$ decreases in the initial phase, as is evident from a comparison of the Figures. A temperature ($T_{50\%}$) at which a certain $M_r$, for example 50% of the original $M_r$, as shown in the examples, is still present is therefore a measure of the uniformity. However, it should be noted that the particle length is included in this consideration. It is known that larger particles lose residual induction at higher temperatures (thermal activation).

The $T_{50\%}$ values and half-widths $\Delta T$, mentioned in the subsequent Examples, of samples according to the pigment type described in EP-A 0 548 642 indicate very broad distributions. This pigment type may be assumed to be typical of all CrO$_2$ pigments obtainable according to the prior art and having coercive forces greater than 60 kA/m.

Low-coercivity, iron-doped CrO$_2$ pigments which can be prepared, for example according to European Patents 0,198,110, 0,146,127, 0,239,089 and 0,304,851, by hydrothermal conversion of CrO$_3$ and Cr$_2$O$_3$ or of chromium(III) chromate having coercive forces of less than 46 kA/m show on the other hand a narrower distribution since only very small amounts of iron, for example less than 0.5% by weight, based on the theoretical CrO$_2$ yield, of Fe$_2$O$_3$, have to be used for such pigments and hence a very inhomogeneous distribution of the iron dopant is not to be expected, and, owing to their coarse particles, these pigments have high thermal activation, for example as indicated by the $T_{50\%}$ value and the half-width of Comparative Example 4 carried out according to European Patent 0,198,110. On the other hand, the distribution of the coercive force is broader if more than 0.5% by weight, based on the theoretical CrO$_2$ yield, of Fe$_2$O$_3$ has to be used to achieve coercive forces of up to 60 kA/m, as indicated by the $T_{50\%}$ values and half-widths documented in Comparative Examples 5 and 6 according to European Patent 0,198,110. European Patent 0,146,127 describes a process in which the coercive force distribution can be improved by using $Fe_2O_3$ dissolved in aqueous $CrO_3$, but no measured values are given to support this quantitatively.

The common feature of all processes described for the preparation of $CrO_2$ having coercive forces of greater than or less than 60 kA/m is that iron oxides or inorganic iron salts, for example iron sulfate, are used for the doping with iron.

It is an object of the present invention to provide a process for the preparation of modified chromium dioxide having a distribution of the particle size and of the coercive force which is narrower compared with the prior art and consequently having improved heat stability of the magnetization in combination with coercive forces of at least 40 kA/m.

SUMMARY OF THE INVENTION

We have found that this object was achieved with a magnetic recording medium consisting of a nonmagnetic substrate and at least one layer which is applied thereon and contains acicular $CrO_2$ as magnetic pigment which is finely distributed in polymeric binders, said magnetic chromium dioxide being modified with iron and tellurium or antimony and having a coercive force of at least 40 kA/m, a saturation magnetization of at least 85 $nTm^3/g$ and a specific surface area (SSA) of at least 25 $m^2/g$, wherein a temperature-dependent decrease in the residual induction by 50% is otained only above 95° C.

Furthermore, we have found, surprisingly, that this object is achieved in a simple manner and, in comparison with the existing processes, without additional expense for the implementation and the production costs by using salt-like iron compounds, at least one of which compounds contains an organic moiety which is completely oxidized to chromic acid. For example, this is fulfilled with iron oxalate in the preparation of chromium dioxide by hydrothermal conversion of a $CrO_3$ suspension to which organic reducing agent has been added.

DETAILED DESCRIPTION OF THE INVENTION

Figure 1:
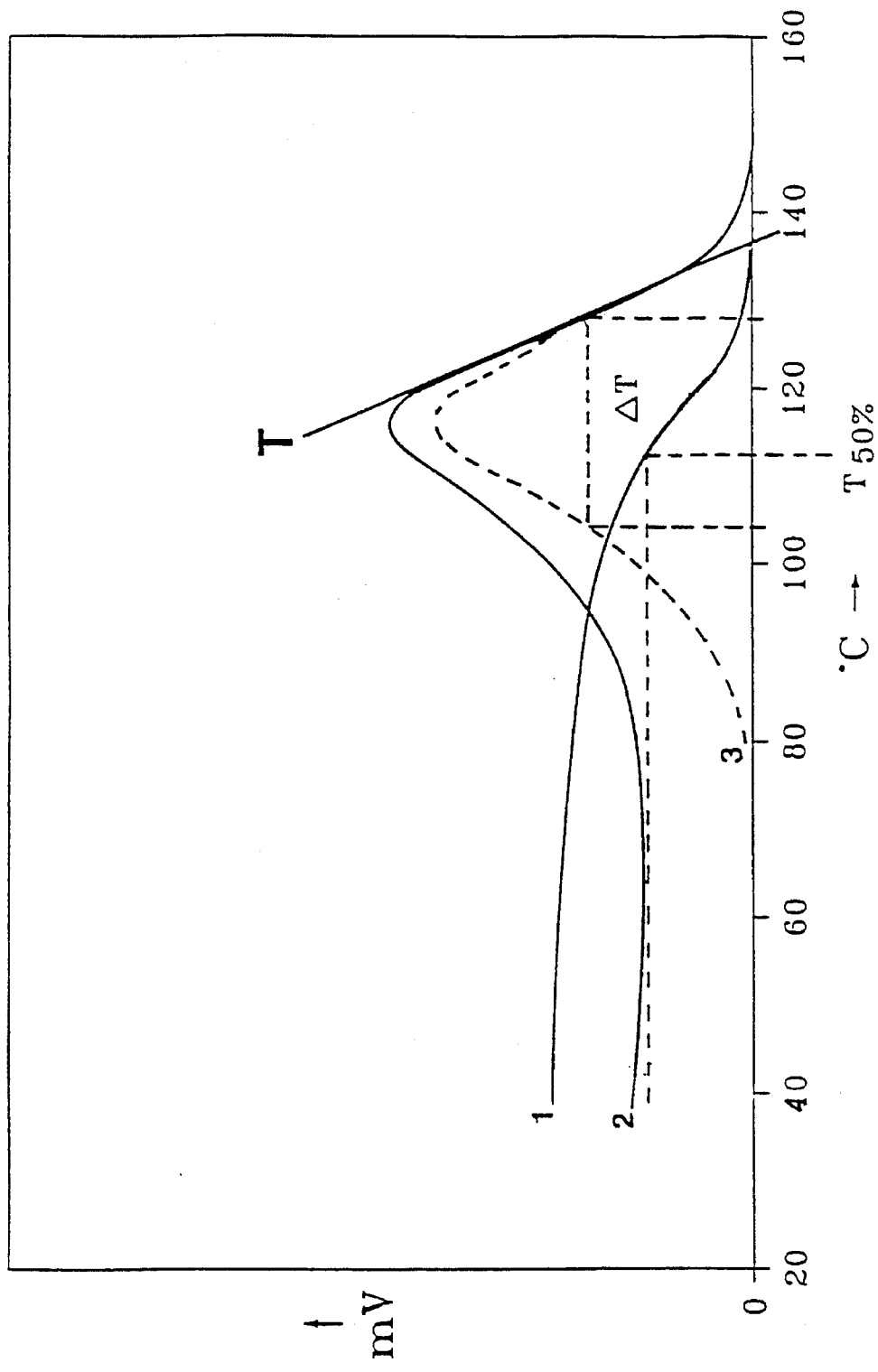
FIG. 1 is a graph which depicts a temperature-dependent measurement of the residual induction and of the susceptibility, beginning at 40° C. of the composition of example 4 according to the invention. Curve 1 shows the temperature dependence of the residual induction and curve 2 shows the result of a measurement which represents the susceptibility superposed by the residual induction.

The coercive forces can be adjusted up to 60 kA/m by doping with pure iron oxalate, and it has been found that up to 10.0% by weight (based on theoretical $CrO_2$ yield) of iron oxalate give the most advantageous result. Larger amounts do not result in an increase in the coercive force above 60 kA/m but have an adverse effect on the particle morphology, as shown in Comparative Example 3. It has also been found that additional doping with iron oxide is required for coercive forces greater than 60 kA/m. Instead of iron oxalate, it is also possible to use iron salts of other organic acids, for example lactate, citrate or tartrate.

In carrying out the novel process, iron oxalate is added a little at a time to a mixture of $CrO_3$ and water, after which an aqueous glycerol solution and octanol are added dropwise. An exothermic reaction takes place, in which the oxalate and the glycerol are oxidized completely and the octanol partially by $CrO_3$.

For the aqueous $CrO_3$ suspension containing dissolved $CrO_3$, the number of parts by weight of $CrO_3$ used per part of water is such that a total weight ratio of from 1.54 to 2.52 parts of $CrO_3$ to 1 part of water results when the amount of water formed in the glycerol oxidation and complete octanol and iron salt oxidation and the amount of water in the glycerol solution are taken into account. To permit better control of the very vigorous reaction of glycerol and $CrO_3$, dilution of the glycerol with water is advantageous. The amount of glycerol and octanol are such that from 20 to 50% of the total amount of $CrO_3$ are reduced from chromium(VI) to chromium(III).

Since the oxalate anion is completely oxidized to $CO_2$ as early as the preparation of the reaction mixture, the effect of the iron oxalate in the novel process is evidently completely different from that described in DE 32 09 739 A1 and European Patent 0,001,524. Both patents describe a process for the preparation of chromium dioxide by oxidation of $Cr_2O_3$ with a suitable oxidizing agent under hydrothermal conditions (from 350 to 500° C. and from 0.5 to 4 kbar), in which the oxalate anion is used for limiting the crystalline growth of $(Cr_{1-x}A_x)O_2$ (where A=Ir or Rh). This effect can be ruled out in the novel process. Owing to the complete oxidation of the oxalate anion or very substantial oxidation of lactate, citrate or tartrate as early as the preparation of the reaction mixture, temperature control as described in DE 23 32 854 and due to oxalic, tartaric, citric or lactic acid decomposition during the conversion of chromium(III) chromate to $CrO_2$ in the autoclave can also be ruled out.

The preparation of the reaction mixture in the novel process begins with the controlled addition of iron oxalate or of other organic iron salts to a thoroughly stirred, aqueous suspension of chromic anhydride and the remaining dopants, which is heated to 50°–70° C. by the heat of reaction, using suitable heating means. The glycerol solution and the octanol are then added while maintaining a preselected maximum temperature. The mixture is homogenized, for example using a dissolver stirrer. In addition to iron oxalate or organic iron salts, tellurium and/or antimony and/or their compounds and, if required, iron oxide are used as modifiers. All modifiers are used in amounts of from 0.05 to 30% by weight each, based on the theoretical amount of $CrO_2$.

In order to carry out the preparation of the reaction mixture in a manner which is simple, rapid and not accompanied by foaming processes, the addition of the organic reducing agents is begun with glycerol, after the addition of the organic iron salts. The free-flowing reaction mixture obtained by the novel procedure is poured into steel reaction containers and converted to chromium dioxide in a high-pressure reactor at not less than 70 bar and from 250° to 420° C. After the maximum temperature has been reached, the mixture is then cooled in a known manner in the course of not more than two hours, preferably immediately, to a temperature of from 220° to 250° C. and at the same time the pressure is let down. The resulting chromium dioxide is removed mechanically from the reaction vessels and is milled.

The $CrO_2$ prepared according to the invention has a saturation magnetization of at least 85 $nTm^3/g$, a coercive force of at least 40 kA/m, a mean particle length of less than 230 nm, an SSA of at least 25 $m^2/g$, a $T_{50\%}$ of over 110° C. and a half-width of less than 24 K in temperature-dependent measurement of the residual induction or of the susceptibility. The product obtained can, if required, be subjected to a surface treatment, by the processes described in the prior art, to stabilize its magnetic properties.

The Examples which follow illustrate the invention and compare it with prior art examples, without restricting the scope of the invention as a result.

As already described, the coercive force distribution of the resulting chromium dioxide was characterized with the aid of a temperature-dependent measurement of the residual induction and of the susceptibility, beginning at 40° C. The measurement method is described in detail in application DE-A 43 39 844, filed in Germany of the same applicant.

The referred German application describes a method for measuring the temperature-dependent magnetic properties of a sample consisting of finely divided magnetizable pigments which are introduced into a heatable sample space, wherein one or more inductive magnetic field sensors are mounted on a rotating drum and, during rotation of the drum, leave a narrow gap between the head gap of the magnetic field sensor and the sample, and wherein the voltage induced in the magnetic field sensor is fed to an indicator via sliding contacts or via a transformer whose primary winding rotates with the drum.

The 50% decrease in the residual induction $T_{50\%}$ (measured in mV) and the half-width $\Delta T$, measured in Kelvin, of the susceptibility serve as a measure for the heat stability of the pigments prepared according to the invention and of the prior art pigments respectively.

Figure 2:
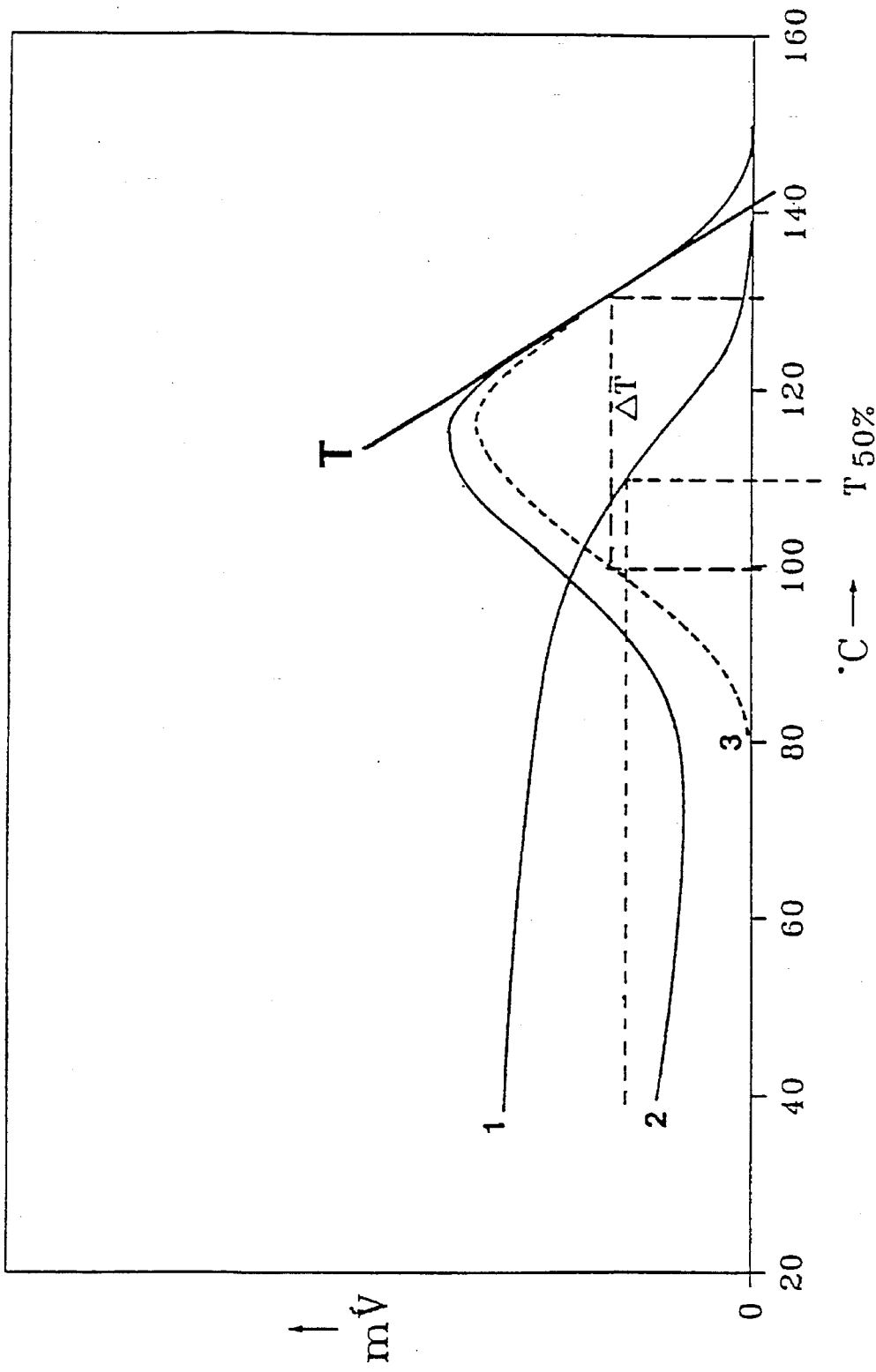
FIG. 2 is a graph which depicts a temperature-dependent measurement of the residual induction and of the susceptibility, beginning at 40° C. of a composition which constitutes the prior art and is based on comparative example 6. Curve 1 shows the temperature dependence of the residual induction and curve 2 shows the result of a measurement which represents the susceptibility superposed by the residual induction.

The result of these measurements is shown in FIG. 1, which corresponds to Example 4 according to the invention, and in FIG. 2, which constitutes the prior art and is based on Comparative Example 6. Curve 1 shows the temperature dependence of the residual induction and curve 2 shows the result of a measurement which represents the susceptibility superposed by the residual induction. If curve 1 is standardized to curve 2 and the difference between the two is calculated, the result is curve 3, which is a measure of the susceptibility.

The specific surface area SSA in ($m^2/g$) according to DIN 66132 was determined by means of a Ströhlein areameter from Ströhlein, Düsseldorf, by the one-point difference method according to Haul and Dümbgen, and the magnetic properties were determined by means of a vibrating sample magnetometer in a magnetic field of 380 kA/m, ie. the coercive force $H_c$ in (kA/m) and the saturation magnetization $M_s/\rho$ in ($nTm^3/g$). The coercive force has been converted to a mean tap density $\rho=1.3$ g/cm$^3$.

The mean needle length of the chromium dioxide was determined from the numerical distribution of the length of more than 200 particles on a scanning electron micrograph (50,000 times magnification). The results of the measurements are shown in the Table. Preparation Examples for the novel $CrO_2$ pigments

EXAMPLE 1

In a 2 l stirred vessel, 113.1 g of water are added to 500 g of $CrO_3$ and 0.76 g of $TeO_2$ and dispersing is carried out with the aid of a dissolver for 10 minutes. Thereafter, 34.1 g of $Fe(C_2O_4)).2H_2O$ (=8.1% by weight, based on the theoretical $CrO_2$ yield) are added in a controlled manner, the mixture heating up to 50°–70° C. with simultaneous cooling. 7.15 g of glycerol in 72 g of water and thereafter 13.1 g of 1-octanol are added to the mixture at from 50° to 70° C. in the course of a further 20 minutes while stirring. The reaction mixture obtained in the manner described is then heated to 320° C. at 210 bar as described in European Patent 0,548,642, after cooling, in steel reaction vessels having a diameter of 5 cm in a high-pressure reactor, the temperature passing through the range from 200° to 300° C. very rapidly, preferably in the course of an hour. Reaction for two hours at 350° C. is immediately followed by cooling and letting down of the pressure. After the mixture has been cooled to room temperature, the resulting $CrO_2$ is removed mechanically from the reaction vessels, dried and milled.

COMPARATIVE EXAMPLE 1

In a reaction vessel having a volume of 2 l, 120.4 g of water are added to 500 g of $CrO_3$ and dispersing is carried out with the aid of a dissolver for 10 minutes. Thereafter, 15.1 g of $Fe_2O_3$ (=3.6% by weight, based on the theoretical yield of $CrO_2$) and 0.67 g of $TeO_2$ are added to the suspension. 7.5 g of glycerol in 72 g of water and 12.35 g of 1-octanol are added to the mixture at 60° C. in the course of a further 20 minutes while stirring. Thereafter, the procedure is as described in Example 1.

EXAMPLE 2

In a reaction vessel having a volume of 2 l, 115.3 g of water are added to 500 g of $CrO_3$, 0.55 g of $TeO_2$ and 12.6 g of $Fe_2O_3$ (=3.0% by weight, based on the theoretical $CrO_2$ yield) and dispersing is carried out with the aid of a dissolver for 10 minutes. Thereafter, 34.1 g of $Fe(C_2O_4)).2H_2O$ (=8.1% by weight, based on the theoretical $CrO_2$ yield) are added in a controlled manner, the mixture heating up to 50°–70° C. with simultaneous cooling. 7.15 g of glycerol in 72 g of water and 13.1 g of 1-octanol are added to the mixture at from 50° to 70° C. in the course of a further 20 minutes while stirring. Thereafter, the procedure is as in Example 1, except that the high-pressure reactor is heated to 320° C. at 210 bar and, after 2 hours, immediately cooled and let down.

Comparative Example 2

The procedure is as in Example 2, except that 112.1 g of water, 0.55 g of $TeO_2$, 62.45 g of $Fe(C_2O_4)).2H_2O$ (=14.9% by weight, based on the theoretical $CrO_2$ yield), 1.7 g of glycerol in 72 g of water and 14.1 g of 1-octanol are used.

Comparative Example 3

The procedure is as in Comparative Example 1, except that 117.1 g of water, 0.55 g of $TeO_2$, 27.7 g of $Fe_2O_3$ (=6.6% by weight, based on the theoretical $CrO_2$, yield), 8.6 g of glycerol in 72 g of water and 14.1 g of 1-octanol are used and the high-pressure reactor is heated to 320° C. at 220 bar and, after 2 hours, is immediately cooled at 320° C. and let down.

EXAMPLE 3

The procedure is as in Example 1, except that 119.8 g of water, 0.71 g of $TeO_2$, 10.5 g of $Fe_2O_3$ (=2.5% weight, based on the theoretical $CrO_2$ yield), 23.6 g of $Fe(C_2O_4)).2H_2O$ (=6.3% by weight, based on the theoretical $CrO_2$ yield), 4.65 g of glycerol in 72 g of water and 13.1 g of 1-octanol are used.

EXAMPLE 4

The procedure is as in Example 2, except that 118.9 g of water, 2.11 g of KSbo($C_4H_4O_6$)).0.5 $H_2O$ (=0.5% by weight, based on the theoretical $CrO_2$ yield), 23.6 g of Fe($C_2O_4$)).2$H_2O$ (=6.3% by weight, based on the theoretical $CrO_2$ yield), 4.46 g of glycerol in 72 g of water and 12.0 g of 1-octanol are used. Thereafter, the further procedure is as in Example 2, except that the high-pressure reactor is heated to 360° C. at 280 bar and then immediately cooled and let down.

Comparative Example 4

The procedure is as in European Patent 0 198 110 B1, Example 1, except that 0.5% by weight of $Fe_2O_3$ and 0.31% by weight of KSbo ($C_4H_4O_6$)).0.5 $H_2O$ are used, the percentages being based on the theoretical $CrO_2$ yield. An aqueous $Na_2SO_3$ treatment is not carried out.

Comparative Example 5

The procedure is as in European Patent 0 198 110 B1, Example 1, except that 1.8% by weight of $Fe_2O_3$ and 0.34% by weight of KSbo ($C_4H_4O_6$)).0.5 $H_2O$ are used, the percentages being based on the theoretical $CrO_2$ yield. An aqueous $Na_2SO_3$ treatment is not carried out.

Comparative Example 6

The procedure is as in European Patent 0 198 110 B1, Example 1, except that 3.6% by weight of $Fe_2O_3$ and 0.41% by weight of KSbo ($C_4H_4O_6$)).0.5 $H_2O$ are used, the percentages being based on the theoretical $CrO_2$ yield. An aqueous $Na_2SO_3$ treatment is not carried out. The results of the measurements of the modified $CrO_2$ powders obtained according to the Examples and the Comparative Examples are shown in Table 1.

TABLE 1

|  | $H_c$ (kA/m) | $M_s/\rho$ (nTm³/g) | Spec. surface area (m²/g) | ΔT (K) | $T_{50\%}$ (°C.) | Needle length (nm) |
|---|---|---|---|---|---|---|
| Example 1 | 56.4 | 96.7 | 27.4 | 23.3 | 116.0 | 160 |
| Example 2 | 70.9 | 86.7 | 25.6 | 21.1 | 110.7 | 200 |
| Example 3 | 55.9 | 92.8 | 25.4 | 23.7 | 132.0 | 200 |
| Example 4 | 49.1 | 99.1 | 27.2 | 23.3 | 113.0 | 170 |
| Comparative Example 1 | 55.8 | 97.6 | 34.3 | 30.0 | 90.0 | 200 |
| Comparative Example 2 | 54.3 | 98.1 | 18.0 | 28.0 | 106.0 | 180 |
| Comparative Example 3 | 71.0 | 91.2 | 36.0 | 44.0 | 95.0 | 170 |
| Comparative Example 4 | 41.3 | 104.5 | 26.1 | 24.0 | 105.6 | 300 |
| Comparative Example 5 | 50.6 | 91.0 | 28.4 | 30.0 | 110.3 | 290 |
| Comparative Example 6 | 58.6 | 96.3 | 33.5 | 30.0 | 110.0 | 270 |

Use Examples

In a mill having a capacity of 500 parts by volume and containing 200 parts by volume of steel balls having a diameter of 1.5 mm, 120 parts of the chromium dioxide obtained according to Example 1 and aftertreated with a sodium sulfite solution were mixed with 27 parts of a 10% strength solution of a thermoplastic polyesterurethane obtained from adipic acid, 1,4-butanediol and 4,4'-diisocyanatodiphenylmethane in a mixture of equal amounts of tetrahydrofuran and dioxane, 48 parts of a 50% strength solution of a commercial polyvinylformal in a mixture of equal amounts of tetrahydrofuran and dioxane, 144 parts of a solvent mixture comprising equal amounts of tetrahydrofuran and dioxane and 2 parts of zinc stearate, and the mixture was dispersed for 4 hours. Thereafter, the same amounts of the two binder solutions, 13.5 parts of the stated solvent mixture and 0.1 part of a commercial silicone oil were added and dispersing was continued for a further 30 minutes. The dispersion was then filtered and was applied to a polyethylene terephthelate film on a commercial coating apparatus by means of a knife coater in a thickness such that, after drying and calendering, a dry layer thickness of 5.5 μm resulted. Immediately after casting the liquid dispersion, the acicular chromium dioxide particles were oriented along the recording direction by means of a magnetic field. The magnetic properties measured for the tape samples, ie. the coercive force $H_c$ in [kA/m], the residual induction $M_r$ in [mT] and the orientation ratio Rf, the ratio of the residual induction in the playing direction to that in the crosswise direction, and the switching field distribution SFD according to Williams and Comstock (AIP conf. Proc. 5 (1971), 738), are shown in the table. The HD factor was determined using the formula $$HD = \frac{KT \cdot L}{100 \cdot \Delta L}$$

where KT is the coercive force of the magnetic layer in [kA/m], measured in an external field of 380 kA/m, L is the mean particle length and ΔL is the range of the particle size distribution determined from the numerical distribution of the particle length, both measured in [nm]. The average peak-to-valley height $R_z$ of the magnetic layer according to DIN 4768 was also measured.

The corresponding measured variables are shown in Table 2. The samples of the Comparative Examples contain $CrO_2$ pigments which were prepared according to European Patent 0,548,642.

TABLE 2

| Results obtained with powder or with magnetic recording medium | | | | |
|---|---|---|---|---|
|  | Example 3 | Example 1 from EP 0 548 642 (comparison) | Example 3 from EP 0 548 642 (comparison) |  |
| Powder |  |  |  |  |
| SSA | 25.6 | 32.3 | 31.0 | m²/g |
| $H_c$ | 70.9 | 62.6 | 72.1 | kA/m |
| $M_s/\rho$ | 86.7 | 91.4 | 85.8 | nTm³/g |
| L | 198 | 284 | 286 | nm |
| ΔL | 52 | 73 | 85 | nm |
| Magnetic tape |  |  |  |  |
| $H_c$ | 72.5 | 62.8 | 76.6 | kA/m |
| $M_r$ | 145 | 142 | 122 | mT |
| RF | 2.2 | 3.5 | 2.7 |  |
| SFD | 0.20 | 0.22 | 0.26 |  |
| $R_z$ | 0.03 | 0.02 | 0.03 |  |
| HD factor | 2.76 | 2.44 | 2.58 |  |

We claim:

1. A process for the preparation of an acicular magnetic chromium dioxide modified with iron and tellurium or antimony and having a saturation magnetization of at least 85 $nTm^3/g$, a coercive force of at least 40 kA/m, a mean particle length of less than 230 nm, specific surface area (SSA) of at least 25 $m^2/g$, and further characterized by a halving of the residual induction with regard to the value measured at 40° C. to one measured above 110° C., when depicted in a graph of rectangular coordinates having an x and a y axis such that when the x axis is expressed in °C. the y axis is indicative of the residual induction in mV, and by a half-width of less than 24° C. determined at the maximum of the temperature-dependent measurement of the susceptibility, when depicted in a graph of rectangular coordinates having an x and a y axis such that when the x axis is expressed in C the y axis is indicative of the susceptibility in mV, by converting an aqueous $CrO_3$ suspension, to which from 0.05 to 30% by weight, based on the theoretical $CrO_2$ yield, of one or more iron compounds and tellurium or antimony compounds, and glycerol and octanol to establish a Cr(VI):Cr(III) ratio of from 4:1 to 1:1, from 1.54 to 2.52 parts by weight of $CrO_3$ being used per part of water, taking into account the amount of water formed in the oxidation of the organic reducing agents, at from 250° to 400° C. under at least 70 bar, wherein at least one of the iron compounds used as modifiers is an iron salt of an organic acid which is oxidized completely by chromic acid.

2. A process as defined in claim 1, wherein the iron compound used as a modifier is iron oxalate and is employed in an amount of at least 1 and not more than 10% by weight, based on the theoretical $CrO_2$ yield.

3. A process as defined in claim 1, wherein the iron compound used as a modifier is a lactate, citrate or tartrate.

4. A process as defined in claim 1, wherein iron oxide is an additional modifier for the doping with iron.

* * * * *